Figure 1:
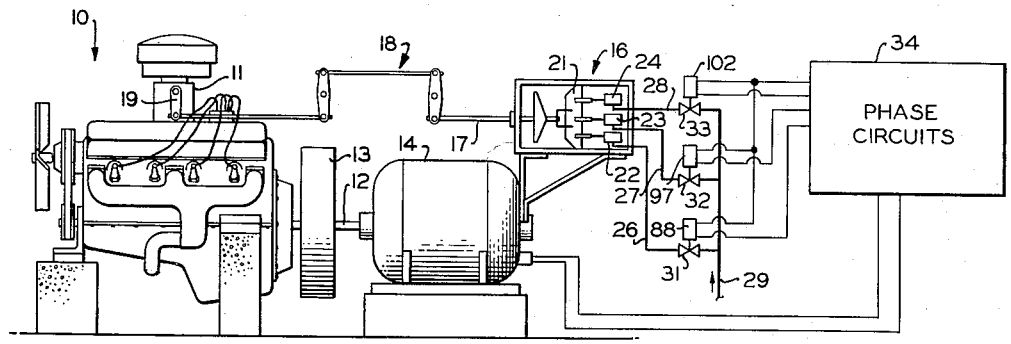

Feb. 9, 1960

H. G. WORSTELL 2,924,095

AUTOMATIC ENGINE CYCLER

Filed Oct. 31, 1955

3 Sheets-Sheet 1

INVENTOR.
H. G. WORSTELL

BY *Hudson & Young*

ATTORNEYS

Feb. 9, 1960
H. G. WORSTELL
2,924,095
AUTOMATIC ENGINE CYCLER
Filed Oct. 31, 1955
3 Sheets-Sheet 2
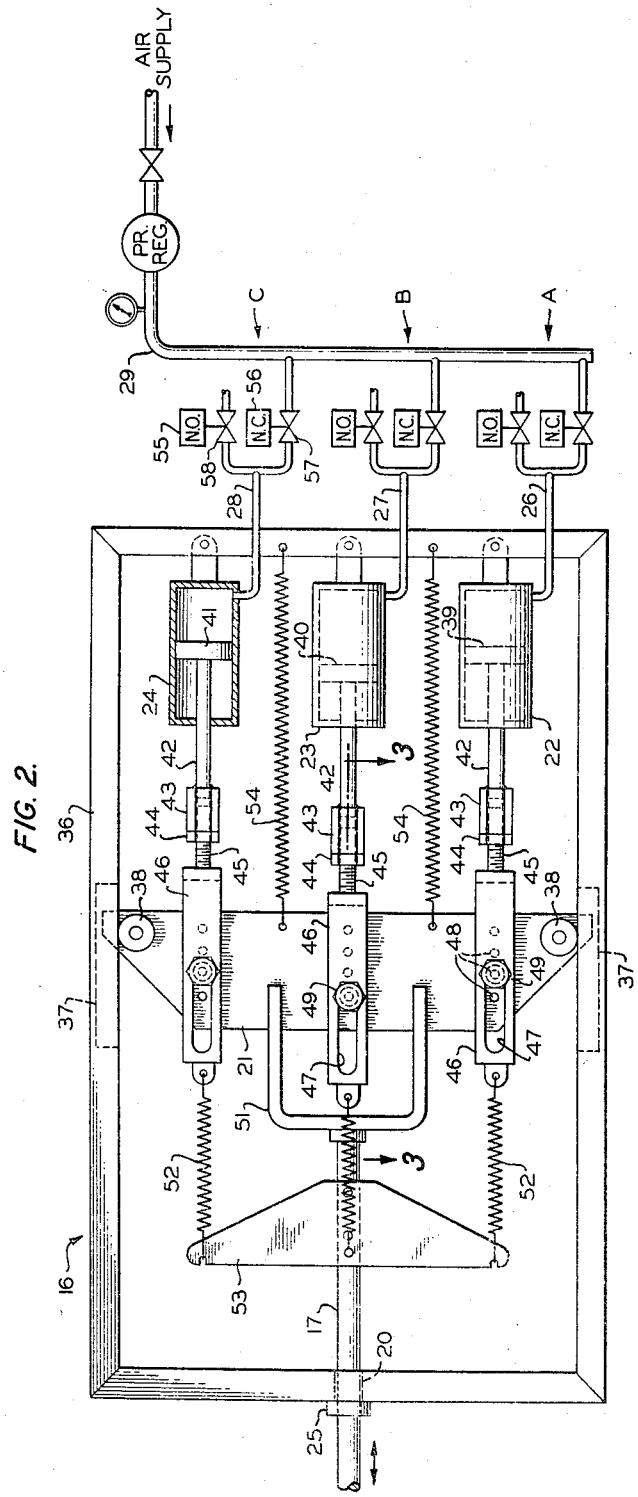
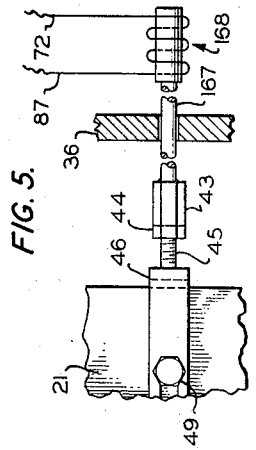
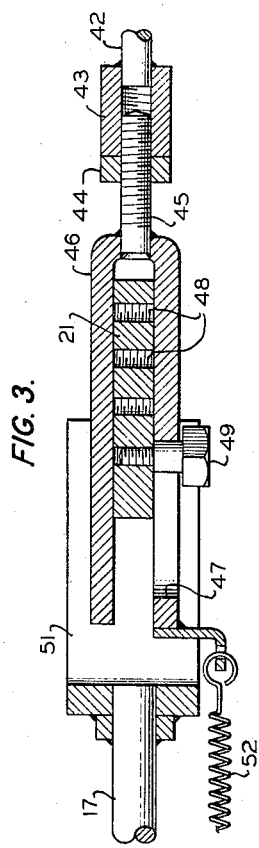
INVENTOR.
H. G. WORSTELL
BY Hudson & Young
ATTORNEYS

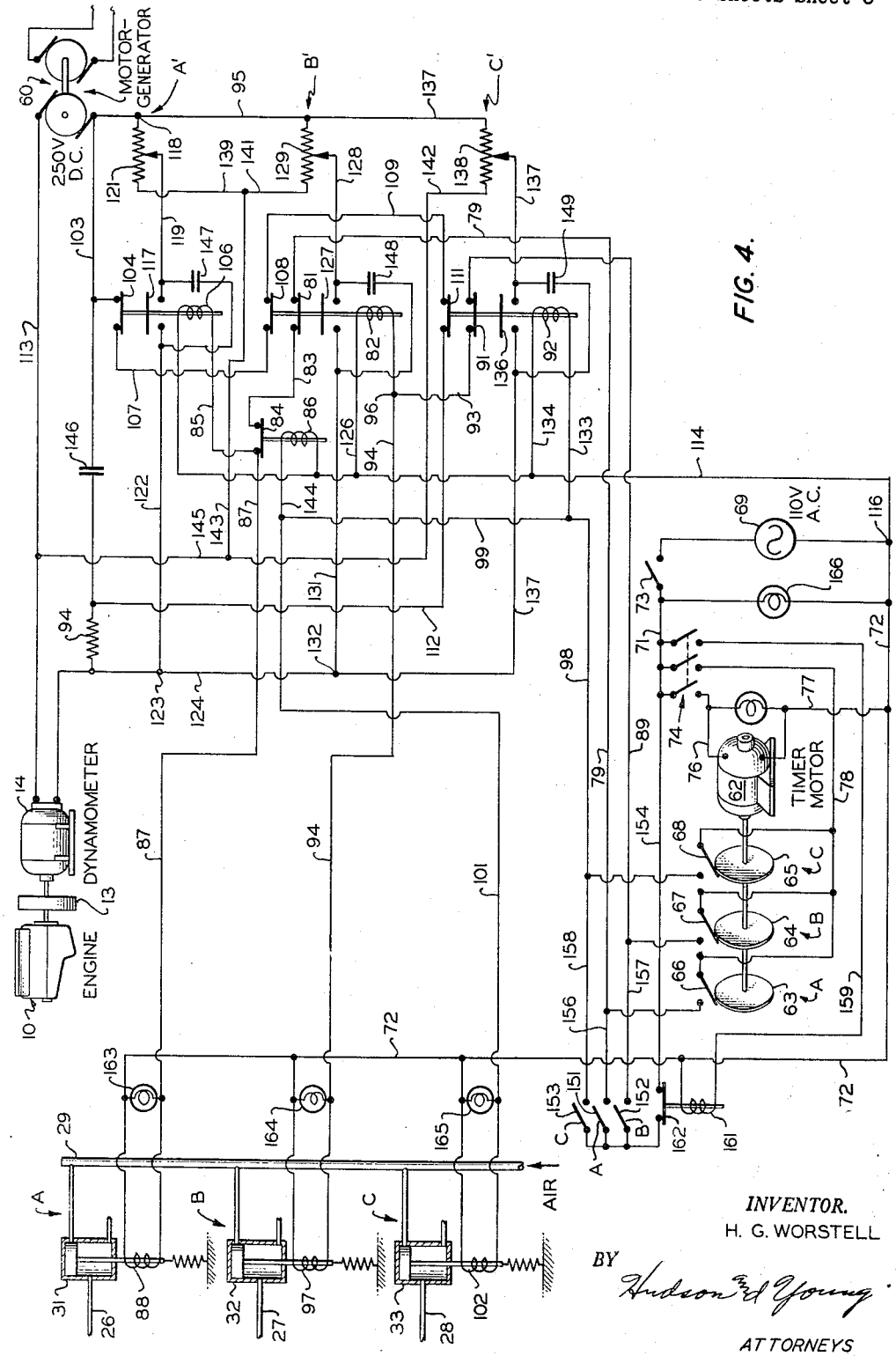

United States Patent Office 2,924,095
Patented Feb. 9, 1960

2,924,095

AUTOMATIC ENGINE CYCLER

Hairston G. Worstell, Bartlesville, Okla., assignor to Phillips Petroleum Company, a corporation of Delaware Application October 31, 1955, Serial No. 543,768

6 Claims. (Cl. 73—116)

This invention relates to an engine cycler for controlling the operation of an engine to simulate actual driving or other desired conditions.

It is conventional to operate a multi-cylinder automotive engine under variable conditions to test motor fuels and lubricating oils and to determine engine life under varying conditions. In the past, motor-fuel octane ratings have been based on the motor method and also on the research method, using a laboratory engine operating at constant speed and fixed conditions. More recently it has been realized that final automotive fuel ratings must be established on a multi-cylinder engine operating under road load conditions. In view of this the necessity of a device for automatically regulating an engine to operate it at various speeds and controlling the load applied to the engine at these various speeds to simulate actual driving conditions is apparent. I have devised an apparatus which automatically controls engine speed and the load placed on the engine at the various speeds to simulate any desired driving conditions.

It is an object of the invention to provide an engine cycler adapted for automatic control and operation of an internal combustion engine. Another object is to provide an engine cycler together with automatic means for operating same to provide any desired cycle of simulated driving conditions. It is also an object of the invention to provide an engine cycler in combination with an engine and a dynamometer, together with electrical circuits which automatically regulate and vary the engine speed and load placed thereon to simulate any selected multi-phase road driving pattern. Other objects of the invention will become apparent from a consideration of the accompanying disclosure.

The invention comprises an engine cycler having a reciprocable yoke attached to a push rod adapted to actuate an engine throttle; a plurality of fixed fluid-actuated cylinders, each provided with a reciprocable piston connected by an adjustable linkage to the yoke so that operation of the fluid cylinders in sequence provides different throttle adjustments (yoke positions) and different engine speeds. The fluid operated cylinders are preferably operated by compressed air, the flow of which to each cylinder is separately controlled by solenoid operated valves which in the normal position (current not flowing) shut off the flow of air to the actuating cylinders and hold the exhaust line from these cylinders open so that the pistons therein are free to move with the yoke. Operation of the solenoid valves in the air supply line is effected and controlled by a series of electrical circuits, one for each solenoid, into which is tied a corresponding series of load-controlling electrical circuits containing rheostats or other type of variable resistance which include a power source and a dynamometer operatively connected to the power shaft of the engine being operated. In this manner the engine is automatically operated at various speeds according to the setting of a motor timer in the solenoid circuits and the linkage adjustment between each actuating piston or cylinder and the yoke.

Figure 6:
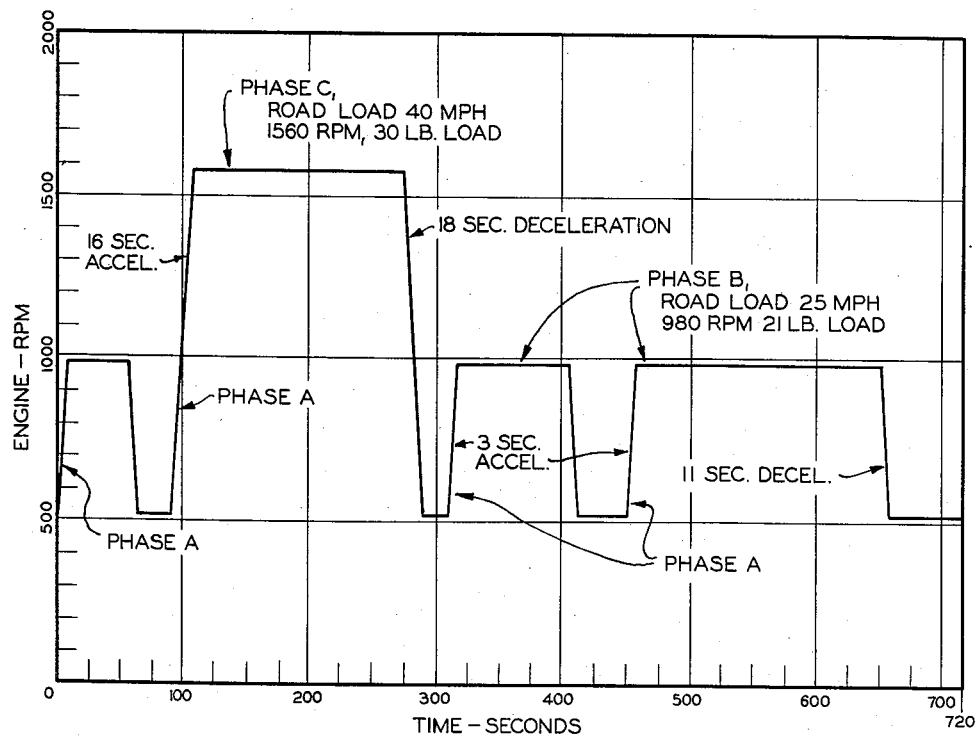

A more comprehensive understanding of the invention may be obtained by reference to the accompanying drawings of which Figure 1 is an elevation showing a preferred arrangement of a combination of the elements of the invention; Figure 2 is a plan view, partly in section, of a preferred embodiment of the engine cycler illustrated as part of the combination in Figure 1; Figure 3 represents a partial section of the apparatus of Figure 2 taken on the line 3—3; Figure 4 is a wiring diagram of the circuits utilized in operating the solenoid valves and the dynamometer; Figure 5 is a plan view of a direct operated solenoid actuated mechanism; and Figure 6 is a graph or chart showing an illustrative driving cycle used with the apparatus of the invention. The various figures of the apparatus are schematic and corresponding parts are correspondingly numbered.

Referring to Figure 1, an engine 10 having a carburetor 11 is connected by a shaft 12 including a heavy flywheel 13, with a dynamometer 14. A throttle positioner 16 having a push rod 17 connects by means of a linkage system 18 with throttle valve arm 19 of carburetor 11. Throttle positioner 16 is provided with a yoke 21 connected by adjustable linkages to cylinders 22, 23, and 24 (the details of engine cycler 16 are shown more fully in Figure 2). The cylinders 22, 23, and 24 are connected by air lines 26, 27, and 28, respectively, with a compressed air line 29 through valves 31, 32, and 33 operated by solenoids 88, 97, and 102, respectively. Box 34 designates electrical circuits, including power source and timing means (illustrated fully in Figure 4) for energizing solenoids 88, 97, and 102 and dynamometer 14 through the leads shown.

Referring to Figure 2, throttle positioner 16 comprises a frame 36 provided with grooves 37 on either side for support of the ends of yoke 21. Rollers 38 together with grooves 37 maintain yoke 21 in alignment with the actuating cylinders 22, 23, and 24 when pistons 39, 40, and 41, respectively, are actuating the yoke. The adjustable linkage connecting each piston with the yoke comprises a piston rod 42, a threaded coupling 43 rigidly attached to rod 42, a lock nut 44 which may be omitted, and a threaded rod 45 which is threaded into coupling 43 and either welded to or threaded into the end of a bifurcated rider 46. Bifurcated rider 46 is provided with a longitudinally elongated slot 47; and yoke 21, along the longitudinal axis of slot 47, is provided with a series of spaced threaded holes 48 into which may be threaded a positioning element 49 which shoulders against yoke 21 as shown more clearly in Figure 3 and serves as a stop in yoke 21 for element 46. A shoulder screw extending through both arms of element 46 which a shoulder nut for fastening may be used in lieu of element 49.

Yoke 21 is rigidly attached to a U-shaped member 51 and push rod 17 is rigidly attached thereto to form a continuous solid linkage between yoke 21 and push rod 17 which connects with the linkage arrangement 18 connected with throttle valve arm 19 of carburetor 11 (shown in Figure 1). Springs 52 attach to the ends of bifurcated riders 46 and to a cross member 53 rigidly attached to push rod 17 so as to hold riders 46 against bolts 49 when the piston operating linkage is not being actuated. This prevents slack occurring in the linkage between bolt 49 and the contacting end of slot 47 which might result in damage to the linkage and/or yoke when compressed air is suddenly admitted to the actuating cylinder to drive the linkage forward. Springs 54 connect with yoke 21 at one end and with frame 36 at the end adjacent the actuating cylinders so as to immediately return yoke 21 to the extreme left position and throttle 19 to the idling position. Push rod 17 extends through an opening 20 in the end of frame 36 and through a bearing 25 attached to frame 36.

The solenoid valve means for controlling the flow of air to the actuating pistons 39, 40, and 41 may be controlled by a single solenoid valve as illustrated in Figure 1 and, more fully, in Figure 4, or it may be controlled by a pair of solenoid valves including a normally closed valve in the line between supply line 29 and feed line 26 (to cylinder 22) and a normally open valve in the exhaust line from line 26. The two solenoids 55 and 56 are connected in parallel and are operated by the same circuit (circuit A of Figure 4) so that energizing the solenoids 55 and 56 immediately opens valve 57 and closes valve 58 so that compressed air immediately enters cylinder 22 behind piston 39 and bottoms the same at the left end of the cylinder so as to advance yoke 21 through the piston rod linkage and open throttle 19 to a predetermined setting.

To provide any desired throttle adjustment for any given phase, such as the phase controlled by actuation of cylinder 22 and piston 39, yoke 21 is positioned so as to provide the desired throttle adjustment or engine speed and while in this position the connecting linkage between bolt 49 and piston rod 42 is adjusted so that when piston 39 is moved to the farthest advanced position (bottomed against the left end of the cylinder) the right end of slot 47 in bifurcated member 46 is in contact with bolt 49 so as to hold yoke 21 in precisely the position required for the desired engine speed or throttle setting. The spaces between bolt holes 48 are smaller than the adjustment accommodation of threaded coupling 43 on rods 42 and 45. In this manner, each set of linkage and piston elements may be set for different throttle an engine speed adjustments which, in combination with dynamometer loads, accurately control driving conditions as desired within the limits of the engine being tested.

Figure 3 shows more clearly the relationship between U-shaped member 51, rod 17, and yoke 21, as well as the structural and positional relationship between bifurcated member 46, yoke 21, holes 48, and bolt 49.

Figure 4 shows a wiring diagram including individual circuits A, B, and C for solenoid operated valves 31, 32, and 33, corresponding individual circuits A', B', and C' connecting a suitable power source such as motor generator 60 with dynamometer 14 operatively connected to motor 10, and tying in circuits A, B, C with solenoid switch-operated circuits arranged to automatically change the motor generator-dynamometer circuit to the one tied in with and corresponding to its respective solenoid energizing circuit A, B, or C. The controlling device in the circuits shown is timer motor 62 provided with cams 63, 64, and 65, adapted to operate switches 66, 67, and 68 sequentially, and in any desired time pattern suitable for the operation of the various phases of the engine cycler. Motor 62 is operatively connected through leads 71 and 72 with a suitable power source, such as a 110-volt A.C. current source 69. A master switch 73 is provided in line 71 and a timer switch 74 is provided in line 76 connecting motor 62 with line 71. Motor 62 is connected by means of line 77 with line 72 to complete the circuit with power source 69. Switches 66, 67, and 68 are connected with line 71 by means of line 78 and timer switch 74.

Each of switches 66, 67, and 68 completes an individual circuit through solenoid valves 31, 32, and 33, respectively, and returning to power source 69 by means of line 72. Switch 66 operated by cam 63 completes a circuit including line 79 which connects with switch 81 operated by solenoid 82, line 83 through switch 84 operated by solenoid 86 to line 87 connecting with one terminal of solenoid 88. The return circuit through solenoid 88 to power source 69 is through line 72.

Switch 67 closes a similar circuit including line 89, switch 91 operated by solenoid 92, line 93 connecting with line 94 at terminal 96, solenoid 97, and line 72.

Switch 68 operated by timer cam 65 closes a similar circuit through line 98 leading to line 99 which in turn connects with line 101 and through the winding of solenoid 102 to line 72.

The idling circuit from motor generator 60 through dynamometer 14 to regulate the load when engine 10 is at idling speed comprises line 103 to switch 104 controlled by solenoid 106, line 107 to switch 108 connected to line 109 leading to switch 111 and through line 112 and resistor 94 to dynamometer 14. The return circuit is through line 113 which connects dynamometer 14 with motor generator 60.

When the circuit from power source 69 through switch 66 and solenoid 88 back to power source 69 is closed, a circuit through solenoid winding 106 and line 114 to terminal 116 of power source 69 is completed which energizes solenoid 106, thereby simultaneously opening switch 104 and closing switch 117. This operation opens the idling circuit just described and completes another power load circuit between motor generator 60 and dynamometer 14 corresponding to and tied in with the energizing circuit through solenoid 88 (phase A). This power load circuit, designated as A', includes lead 95 to terminal 118, line 119, rheostat 121, switch 117, line 122 to terminal 123 in line 124 which leads to dynamometer 14 to complete the circuit to line 113 and to power source 60.

In a similar manner when current is flowing through switch 67 and solenoid 97 (phase B), a circuit connecting with terminal 96 and leading through solenoid 82, line 126 and line 114 completes a circuit back to terminal 116 and power source 69 so as to energize solenoid switch 82 thereby opening switch 81 and closing switch 127, which breaks the circuit at switch 81 to flow of current to solenoid 88 and closes another power load circuit B' through lead 95, line 128, rheostat 129, switch 127, line 131 to terminal 132 in line 124, and then through line 124 to dynamometer 14. When solenoid 82 is energized and switch 81 is opened, the supply of current to solenoid 88 is cut off even though switch 66 is still closed and also solenoid 106 connecting with line 87 at switch 84 is deenergized allowing switch 117 to open and switch 104 to close since this solenoid is spring biased in the position shown in the drawing. Hence, it is necessary to simultaneously open switch 108 with the opening of circuit A because of the closing of switch 104, in order to prevent reestablishing of the idling load circuit through dynamometer 14. The opening of switch 117, of course, opens circuit A' simulantously with the establishing of circuit B' by the closing of switch 127.

When switch 68 is closed by motor cam 65 and a circuit is completed from power source 69 through solenoid 102, a circuit is also completed through solenoid 92 by means of lines 133 and 134 to line 114 leading back to terminal 116 of power source 69. Then energizing of solenoid 92 opens switches 91 and 111 and closes switch 136. This operation of the switches associated with solenoid 92 completes a new power load circuit C' through dynamometer 14 via lines 95, 137, rheostat 138, switch 136, line 137, and line 124 and simultaneously opens switch 91 which cuts off the flow of current to solenoid 97 and also to solenoid 82 so that switches 108 and 81 are again closed and switch 127 is opened, therefore, breaking the load circuit B'. The opening of switch 111 is necessary at this time in order to prevent the reestablishment of the idling load circuit because of the closed position of switches 104 and 108.

When solenoid 92 is energized and switch 91 is open, the circuit through solenoid 82 is broken so that normally closed switch 81 returns to the closed position as shown in the drawing, thereby reestablishing the circuit through switch 66 associated with timer cam 63 in the event switch 66 is closed so that solenoid 88 would be again energized if the circuit were not again broken by suitable means. This breaking of the circuit through solenoid 88 is effected by the energizing of solenoid 86 which connects with line 99 by means of line 144 and line 114 which connects with the other terminal of the solenoid so as to complete the circuit back to the terminal 116 of power source 69. Energizing of solenoid 86 opens switch 84 in lines 85 and 87, thereby again opening the circuits to solenoids 88 and 106.

Rheostats 121 and 129 are connected with line 143 which connects with line 145. Rheostat 138 is also connected with line 145 through line 142, and line 145 bypasses dynamometer 14 and connects with return line 113 to motor generator 60. This arrangement provides for passage of a small current through the rheostats when the circuits in which the rheostats are positioned are not in operation in regulating the power load on the dynamometer and thereby maintain the rheostats in a warm condition so as to decrease the fluctuation in resistance thereof. Condensers 146, 147, 148, and 149 are positioned in the load circuits connecting the power source 60 with the dynamometer so as to dissipate the inductive energy and protect the points against arcing. Resistance 94 in line 103 functions to discharge condenser 146.

The system shown in Figure 4 is provided with a means for manually operating and controlling the engine cycler. The manual system includes switches 151, 152, and 153 which are connected to power line 71 from power source 69 through line 154. Switch 151 connects through line 156 with circuit A at line 79; switch 152 connects through line 157 with circuit B at line 89; and switch 153 connects through line 158 with circuit C at line 98. As a safety feature in order to render manual operation of switches 151, 152, and 153 inoperative at any time that timer switch 74 is in operation, lead 159 from one of the terminals of triple timer switch 74 passes through solenoid 161 and connects with line 72 so that, when switch 74 is closed and timer motor 62 is functioning, current passes through line 159 so as to energize solenoid 161 and hold switch 162 in line 154 open, thereby preventing passage of current to the manual switch.

In order to indicate which circuits are in operation at any given time during a cycle, colored lights 163, 164, and 165 are provided in circuits A, B, and C at any suitable visible location such as near the solenoid operated air valves as shown in the drawing. A light 166 is connected across power lines 71 and 72 back of master switch 73 to indicate when power is flowing to timer switch 74.

It is apparent from the wiring diagram that circuit B overrides circuit A, and circuit C overrides both circuits A and B. This provides sharp changes from one phase to another during operation of the cycle. In changing from an acceleration phase to a constant speed phase, for example, the engine cycler definitely prevents engine "hunting."

Figure 5 shows an additional embodiment of the invention utilizing an actuating rod 167 directly operated by a solenoid 168 connected in the circuit of phase A at lines 87 and 72 (shown in Figure 4). This arrangement is also fast acting and may be utilized to advantage in actuating yoke 21 through a suitable linkage arrangement such as that of Figure 2. In fact, any fast acting device amenable to accurate control may be utilized in the combination of elements of the invention to move yoke 21.

Figure 6 illustrates a cycle of operation used in various tests on a late model high-compression V-8 automobile engine. The apparatus of the invention was set up to correspond substantially with the arrangement shown in Figure 1. This circuit of phase A was used for all accelerations, including three 3-second accelerations to 980 r.p.m. (25 m.p.h.) and a 16-second acceleration to 1560 r.p.m. (40 m.p.h.). The manual switches are used for setting the engine conditions. In setting the cycler for phase A, the yoke 21 was positioned so as to set the throttle for 2300 r.p.m. with a 48 pound load (corresponding to 60 m.p.h. road condition) applied to the engine by the dynamometer (through adjustment of rheostat 121) and the linkage between piston 39 and yoke 21 was adjusted so that when piston 39 was driven to its farthermost position to the left, the linkage positioned the right end of slot 47 against bolt 49 with yoke 21 in the desired position.

After this throttle setting, the load was changed to provide an acceleration from 500 to 1560 r.p.m. in 16 seconds. A remote hand throttle is used in the initial settings of the throttle positions for the various phases and this positions the yoke.

Phase B was controlled by a corresponding setting of the linkage between piston 40 and the yoke to position the throttle to provide a motor r.p.m. of 980 with a 21 pound load applied by the dynamometer and regulated by adjustment of rheostat 129. This setting of the cycler and dynamometer circuit was used to simulate a road load of 25 m.p.h.

Phase C, simulating a road load of 40 m.p.h. with a motor r.p.m. of 1560 with a 30 pound load on the dynamometer, was controlled by a corresponding setting of the linkage between piston 41 and the yoke, along with adjustment of rheostat 138 to place the desired load through dynamometer 14 on the engine.

The fourth phase of the engine cycler was the idling speed of 500 r.p.m. shown in Figure 6 and controlled by the extreme right position of yoke 21 when phases A, B, and C, controlled by actuating cylinders 22, 23, and 24, respectively, were not in operation.

The arrangement of apparatus included a 250 volt direct current motor generator as unit 60. The idling load circuit included a 1700 ohm resistance (element 94). The rheostats were 0 to 500 ohm resistance. The dynamometer was an eddy current inductor type of 400 B.H.P.

The timer motor-cam arrangement was set to operate switches 66, 67, and 68 in the proper sequence and for the various times shown in Figure 6. Switch 66 was closed at the beginning of each cycle for a period of more than three seconds before switch 67 was closed. Switch 67 closed 3 seconds after the closing of switch 66. Switch 67 made contact for a period of 54 seconds in the first instance before breaking the circuit to allow the engine to decelerate to idling speed of 500 r.p.m. After a few seconds, phase A was again thrown into operation by the closing of switch 66 and after 16 seconds acceleration, phase C closed switch 68 so as to cut off acceleration at 1560 r.p.m. with a 30 pound load on the dynamometer corresponding to a road load of 40 m.p.h. After 170 seconds of operation of phase C, contact was broken by switch 68 to allow the engine to decelerate over a period of 18 seconds to idling speed. Following a short idling period, phase A again went into operation to bring the engine up to a speed of 980 r.p.m. at which time phase B went into operation by closing switch 67. At the end of a 100-second period the timer control opened switch 67 and allowed the engine to decelerate to idling speed. The succeeding operation of the timer control is similar to that just described to provide another acceleration period to 980 r.p.m. under a 21 pound load for a period of two hundred seconds followed by a deceleration period and an idling period. The time cycle may be repeated as long as fuel and current are provided.

The time cycle illustrated in Figure 6 represents simulated driving conditions common to suburban driving and representing an acceleration to a 25 m.p.h. speed, maintaining that speed for about 54 seconds, and stopping for a stop sign, following which there is an acceleration period to a speed of 40 m.p.h. which is maintained for about 3 minutes (170 seconds) after which there is another stop for a stop sign followed by an acceleration to 25 m.p.h., stopping for another stop sign, then another acceleration period followed by a driving period at 25 m.p.h. until the destination is reached, at which time the engine is idled for a few seconds before cutting it off. The cycler and circuits shown and described may be adjusted to provide a cycle of operation to simulate practically any tye of driving desired. If additional speeds or phases in the operation cycle are desired, these may be provided by utilizing additional components in the cycler with corresponding phase circuits including corresponding dynamometer circuits tied in with the phase circuits to provide the desired load on the engine.

Certain modifications of the invention will become apparent to those skilled in the art and the illustrative details disclosed are not to be construed as imposing unnecessary limitations on the invention.

I claim:

1. An engine cycler comprising a frame having two parallel slotted bars therein, a yoke extending between said bars so that the ends of said yoke extend into the slots of the bars, a roller secured near each end of said yoke to engage said bars so that said yoke is free to move parallel to said bars, a push rod rigidly attached to said yoke and extending therefrom in a first direction which is generally parallel to said bars, a plurality of bifurcated riders positioned on said yoke and extending parallel to said bars, the open ends of said riders extending in said first direction, one of the legs of each of said riders being provided with a longitudinally extending slot, said yoke being provided with a plurality of a series of holes, each of said series of holes extending in a line parallel to said bars, lock members extending through each of said slots into one of said holes, spring members urging each of said riders toward said first direction, spring means urging said yoke in a second direction opposite said first direction, an adjustable coupling rod extending from each of said riders in said second direction, and means to engage the ends of said coupling rods to impart movements to said coupling rods selectively to urge the riders and said yoke in said first direction.

2. The engine cycler of claim 1 wherein the last-mentioned means comprises a piston secured to the end of each of said coupling rods, a cylinder enclosing each of said pistons, and means to admit pneumatic pressure to said cylinders selectively to move said pistons in said one direction.

3. The engine cycler of claim 1 wherein the last-mentioned means comprises a solenoid associated with each of said coupling rods so that said coupling rods are moved in said first direction when the solenoid is energized.

4. Engine testing apparatus comprising a push rod adapted to be attached to the accelerator of an engine to be tested, a dynamometer adapted to apply a load to the engine to be tested, a frame having two parallel slotted bars therein, a yoke extending between said bars so that the ends of said yoke extend into the slots of the bars, a roller secured near each end of said yoke to engage said bars so that said yoke is free to move parallel to said bars, means for connecting said push rod to said yoke so that said push rod extends from said yoke in a first direction which is generally parallel to said bars, a plurality of bifurcated riders positioned on said yoke and extending parallel to said bars, the open ends of said riders extending in said first direction, one of the legs of each of said riders being provided with a longitudinally extending slot, said yoke being provided with a plurality of a series of holes, each of said series of holes extending in a line parallel to said bars, lock members extending through each of said slots into one of said holes, spring members urging each of said riders toward said first direction, spring means urging said yoke in a second direction opposite said first direction, an adjustable coupling rod extending from each of said riders in said second direction, means to engage the ends of said coupling rods to impart movements to said coupling rods selectively to urge the riders and said yoke in said first direction, and means for adjusting the load applied by said dynamometer to a preselected value upon one of said riders being moved in said first direction responsive to said means to impart.

5. An engine cycler comprising a frame member including two spaced parallel bars, a yoke, means positioning said yoke between said bars so as to be free to move generally parallel to said bars, a push rod secured to said yoke and extending therefrom, a plurality of bifurcated riders positioned on said yoke and extending generally parallel to said bars, means adjustably attaching said riders to said yoke, a resilient means urging said yoke in a first direction parallel to said bars, an adjustable connecting rod extending from each of said riders in said first direcion, and means to impart movements to said connecting rods selectively to urge said riders in a second direction opposite said first direction.

6. The engine cycler of claim 5 wherein the last-mentioned means comprises a piston secured to the end of each of said coupling rods, a cylinder enclosing each of said pistons, a source of pneumatic pressure, a plurality of first valves connected between said source of pressure and said cylinders, respectively, a plurality of second valves connected between a vent and said cylinders, respectively, and means to open and close said valves selectively so that the pneumatic pressure is applied to said cylinders sequentially.

References Cited in the file of this patent

UNITED STATES PATENTS

| | | |
|---|---|---|
| 1,508,353 | Scott | Sept. 9, 1924 |
| 1,795,896 | Schenck | Mar. 10, 1931 |
| 1,866,347 | Crocker | July 5, 1932 |
| 2,669,870 | Bennett | Feb. 23, 1954 |
| 2,700,301 | Thomsen | Jan. 25, 1955 |